(12) United States Patent
Simsek et al.

(10) Patent No.: US 10,367,695 B2
(45) Date of Patent: Jul. 30, 2019

(54) METHOD FOR SIMULATING A COMMUNICATION SYSTEM, SIMULATION SYSTEM FOR A COMMUNICATION SYSTEM AND COMPUTER PROGRAM

(71) Applicant: VOLKSWAGEN AG, Wolfsburg (DE)

(72) Inventors: Burak Simsek, Braunschweig (DE); Hendrik-Jörn Günther, Hannover (DE)

(73) Assignee: VOLKSWAGEN AG, Wolfburg (DE)

( * ) Notice: Subject to any disclaimer, the term of this patent is extended or adjusted under 35 U.S.C. 154(b) by 718 days.

(21) Appl. No.: 14/921,813

(22) Filed: Oct. 23, 2015

(65) Prior Publication Data
US 2016/0119191 A1 Apr. 28, 2016

(30) Foreign Application Priority Data
Oct. 23, 2014 (DE) .......................... 10 2014 221 552

(51) Int. Cl.
*H04W 16/22* (2009.01)
*H04L 12/64* (2006.01)
*H04L 12/24* (2006.01)

(52) U.S. Cl.
CPC ........ *H04L 41/145* (2013.01); *H04L 12/6418* (2013.01); *H04W 16/22* (2013.01)

(58) Field of Classification Search
CPC ... H04L 41/145; H04L 12/6418; H04W 16/22
USPC ................................................ 703/13, 21, 6
See application file for complete search history.

(56) References Cited

U.S. PATENT DOCUMENTS

| | | | | |
|---|---|---|---|---|
| 5,696,515 A | * | 12/1997 | Zyren | B60G 17/0165 342/104 |
| 5,905,458 A | * | 5/1999 | Ashihara | G01S 7/35 342/109 |
| 6,820,042 B1 | | 11/2004 | Cohen et al. | |
| 7,089,099 B2 | * | 8/2006 | Shostak | B60C 23/005 701/29.6 |
| 8,085,706 B2 | * | 12/2011 | Matsumoto | H04W 74/085 370/322 |
| 8,183,952 B2 | * | 5/2012 | Bunce | H01P 1/387 333/1.1 |

(Continued)

FOREIGN PATENT DOCUMENTS

| | | |
|---|---|---|
| CN | 101873710 A | 10/2010 |
| CN | 203233545 | 10/2013 |

(Continued)

*Primary Examiner* — Juan C Ochoa
(74) *Attorney, Agent, or Firm* — Hunton Andrews Kurth LLP

(57) ABSTRACT

A method for simulating a communication system, and simulation system for a communication system and computer program, the communication system having a communication protocol which regulates a communication between at least two transmitter-receivers of the communication system via a common communication channel in such a way that a first transmitter-receiver transmits a data packet only when no use of the communication channel by a second transmitter-receiver is indicated to the first transmitter-receiver, includes sending a data packet by at least the first transmitter-receiver via the common communication channel even when at least the second transmitter-receiver is using the communication channel.

14 Claims, 3 Drawing Sheets

(56) References Cited

U.S. PATENT DOCUMENTS

| | | | |
|---|---|---|---|
| 8,208,382 B2* | 6/2012 | Jerbi | G08G 1/0104 370/241 |
| 8,520,695 B1 | 8/2013 | Rubin et al. | |
| 8,922,391 B2* | 12/2014 | Rubin | G08G 9/02 340/903 |
| 9,084,190 B2* | 7/2015 | Noh | H04W 84/18 |
| 2003/0144018 A1 | 7/2003 | Minnick et al. | |
| 2005/0053008 A1 | 3/2005 | Griesing et al. | |
| 2006/0229018 A1* | 10/2006 | Mlinarsky | H04B 7/0413 455/67.11 |
| 2008/0103738 A1 | 5/2008 | Chandrashekar et al. | |
| 2014/0055288 A1 | 2/2014 | Menzel et al. | |
| 2014/0172393 A1 | 6/2014 | Kang et al. | |
| 2014/0241444 A1 | 8/2014 | Li et al. | |

FOREIGN PATENT DOCUMENTS

| | | |
|---|---|---|
| CN | 104080190 A | 10/2014 |
| DE | 10 2005 044 236 | 3/2007 |

* cited by examiner

METHOD FOR SIMULATING A COMMUNICATION SYSTEM, SIMULATION SYSTEM FOR A COMMUNICATION SYSTEM AND COMPUTER PROGRAM

CROSS-REFERENCE TO RELATED APPLICATIONS

The present application claims priority to Application No. 10 2014 221 552.8, filed in the Federal Republic of Germany on Oct. 23, 2014, which is expressly incorporated herein in its entirety by reference thereto.

FIELD OF THE INVENTION

The present invention relates to methods and systems for simulating a communication system.

BACKGROUND INFORMATION

Conventionally, motor vehicles are often equipped with communication devices in order to allow for an exchange of information for various purposes between multiple on-board-units integrated into these motor vehicles. In some cases it may be necessary to test communication systems with multiple transmitter-receivers, which are designed for vehicle-to-vehicle (V2V) communication or generally for communication originating from a vehicle (V2X), before a standard installation of such a transmitter-receiver can occur. This may be uneconomical or impractical in some scenarios, e.g. if several hundred vehicles are involved in the communication, and if in this manner a situation of a high channel load is to be re-enacted. Simulations could offer an alternative for this purpose. Simulations may deliver unreliable results, however, and normally offer no possibility of testing actual hardware, e.g. by a hardware-in-the-loop (HiL) method. HiL refers to a method in which an embedded system is connected via its inputs and outputs to an adapted counterpart, which is generally called a HiL simulator and which acts as a replica of the real environment of the system. Such methods may technically not be possible e.g. in computer-based simulations.

Consequently, it is desirable to improve a concept for simulating a communication network in a communication between vehicle-based transmitter-receivers.

SUMMARY

Exemplary embodiments of the present invention relate to a method for simulating a communication system having a communication protocol. The communication protocol regulates a communication between at least two transmitter-receivers of the communication system via a common communication channel in such a way that a first transmitter-receiver, in order to avoid a data collision, transmits a data packet only when no use of the communication channel by a second transmitter-receiver is indicated to the first transmitter-receiver. The method may include a sending of a data packet by at least the first transmitter-receiver via the common communication channel even when at least the second transmitter-receiver is using the communication channel. It is thus possible to bypass the protocol so that it is possible to simulate a desired volume of data traffic or data collisions. As a result, costly or materially demanding test arrangements having an unnecessary or unrealistic multitude of communication devices may possibly be omitted.

In some exemplary embodiments, the method furthermore may include a modification of a return signal, which may include information about a current usage or release of the channel. The modification occurs in such a way that the return signal includes information about a release of the channel irrespective of an actual usage of the channel. In other words, this makes it possible for example to modify a driver, if available, which runs on a transmitter-receiver.

In some exemplary embodiments, the return signal may include additionally a remaining time value until the channel is released. For this purpose, the return signal may be modified in such a way that it includes a time value of zero irrespective of the actually remaining time value. This is able to effect a modification of the driver in such a way that the return signal no longer corresponds to the actually prevailing conditions, whereby the communication protocol is effectively bypassed.

In some exemplary embodiments, the communication channel has an uplink direction and a downlink direction. The method furthermore may include a damping of a direction from the group of the uplink direction and the downlink direction in such a way that no usage of the communication channel by the second transmitter-receiver is indicated to the first transmitter-receiver. It is thus possible that a driver is no longer able to perceive a signal originating from the second transmitter-receiver as critical for ascertaining a channel usage, as a result of which even a protocol-conforming procedure may result in a data collision.

In some exemplary embodiments, the method furthermore may include a temporary damping of an additional direction from the group of the uplink direction and the downlink direction in such a way that no usage of the communication channel by the first transmitter-receiver is indicated to the second transmitter-receiver. This may allow for the previous damping to be bypassed so that a data collision may be avoided for specific time periods.

In some exemplary embodiments, the method furthermore may include a transmission of a representation of an input signal originating from the second transmitter-receiver via the uplink direction, and another representation of the input signal originating from the second transmitter-receiver via the downlink direction by way of a signal splitter. This in principle allows for a bypass of a communication path.

In some exemplary embodiments, the damping of the direction or of the additional direction occurs with the aid of a circulator in such a way that a damped representation of an input signal coming in on a first terminal of the circulator through the second transmitter-receiver is provided on a second terminal of the circulator. This allows, if required, for a transmission of a signal essentially unmodified in one direction, and a transmission of another signal with the mentioned damping in a reverse direction.

In some exemplary embodiments, the temporary damping of the direction or of the additional direction occurs by way of an isolator segment between the first transmitter-receiver and the second transmitter-receiver. For this purpose, a control element provides a control signal to the isolator segment, which effects a modification of the temporary damping in such a way that a usage of the communication channel by a second transmitter-receiver is indicated to the first transmitter-receiver. This makes it possible actively to select and control time intervals in which a bypass, and thus no data collision, occurs.

Additional exemplary embodiments moreover also create a program or computer program having program code for implementing one of the mentioned methods when the program code is executed in a computer, a processor or a programmable hardware component such as e.g. an application-specific integrated circuit (ASIC).

Exemplary embodiments of the present invention relate to a simulation system for a communication system having a communication protocol. The communication protocol regulates a communication between at least two transmitter-receivers of the communication system via a common communication channel in such a way that a first transmitter-receiver, in order to avoid a data collision, transmits a data packet only when no use of the communication channel by a second transmitter-receiver is indicated to the first transmitter-receiver. The simulation system is developed in such a way that at least the first transmitter-receiver transmits a data packet over the common communication channel even when at least the second transmitter-receiver uses the communication channel. Such a system is able to avoid elaborate, unrealistic or costly simulation arrangements.

In some exemplary embodiments, a circulator is connected between the first transmitter-receiver and the second transmitter-receiver so that a first terminal of the circulator is connected to the first transmitter-receiver and a second terminal of the circulator is connected to the second transmitter-receiver so that the data packet originating from the first transmitter-receiver is provided on the second terminal of the circulator and a damped representation of an input signal originating from the second transmitter-receiver is provided on the first terminal of the circulator. This may furthermore even allow for an arrangement made up of multiple circulators so as to achieve the desired degree of damping.

In some exemplary embodiments, the first transmitter-receiver is connected to the second transmitter-receiver additionally via an isolator segment. The isolator segment effects a damping of an input signal originating from the second transmitter-receiver. For this purpose, the isolator segment is connected to a control element. The control element provides a control signal to the isolator segment, which effects a modification of a damping of the additional input signal in such a way that a usage of the communication channel by a second transmitter-receiver is temporarily indicated to the first transmitter-receiver. This may allow for an active control for defining time intervals in which a data collision can occur.

In some exemplary embodiments, the communication protocol is a WLAN protocol according to an IEEE802.11 standard. This can make it possible to include conventional transmitter-receivers in the simulation system.

Further features and aspects of exemplary embodiments of the presented invention are described and explained in detail below with reference to the appended figures.

DETAILED DESCRIPTION

Figure 1:
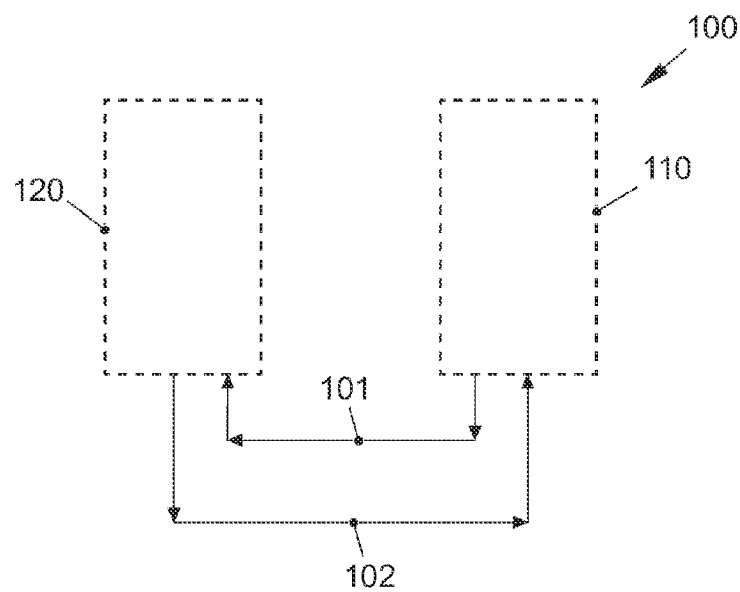
FIG. 1 shows a schematic representation of a simulation system for a communication system according to one exemplary embodiment of the present invention.

Various exemplary embodiments are now described in more detail with reference to the appended drawings, in which some exemplary embodiments are depicted. For the sake of clarity, the figures may represent the thickness dimensions of lines, layers and/or regions in exaggerated fashion.

In the subsequent description of the appended figures, which show exemplary embodiments, identical reference numerals indicate identical or comparable components. Furthermore, conflated reference numerals are used for components and objects that occur several times in an exemplary embodiment or in a drawing, but which are described jointly with respect to one or multiple features. Components or objects that are described using identical or conflated reference numerals may be embodied in identical fashion with respect to individual or multiple or all features, for example their dimensions, but may also be embodied in varying fashion, unless the description explicitly or implicitly indicates otherwise.

Although exemplary embodiments may be modified and changed in various ways, exemplary embodiments are shown in the figures as examples and are here described in detail. It should be noted, however, that there is no intention of limiting exemplary embodiments to the respectively disclosed forms, but that exemplary embodiments rather are to cover all functional and/or structural modifications, equivalents and alternatives in the area of the invention. In the entire description of the figures, identical reference numerals indicate identical or similar elements.

It should be noted that an element that is indicated as being "connected" or "coupled" with another element may be connected or coupled directly with the other element or interposed elements may exist. If by contrast an element is indicated as being "directly connected" or "directly coupled," then no interposed elements exist. Other terms used to describe the relation between elements should be interpreted in a similar manner (e.g., "between" versus "directly between," "adjacent" versus "directly adjacent" etc.).

The terminology used herein only serves to describe specific exemplary embodiments and shall not limit the exemplary embodiments. As used herein, the singular forms "a," "an" and "the" shall also comprise the plural forms, unless the context clearly indicates otherwise. It should also be noted that the expressions as used herein such as e.g. "contains," "containing," "has" and/or "having," "comprises" and/or "comprising" indicate the presence of mentioned features, whole numbers, steps, work cycles, elements and/or components, but do not exclude the presence or the addition of one or multiple features, whole numbers, steps, work cycles, elements, components and/or groups.

Exemplary embodiments of the present invention may offer a possibility for testing or emulating V2V/V2X communication, e.g. in hardware-in-the-loop (HiL) concepts. HiL is a method for testing and securing embedded systems for support during a development and for taking machines or systems into operation early. For this purpose, the communication is tested under the condition of a high channel load, for which it may become impractical or even impossible to construct a realistic test environment. One example for such a scenario is an investigation of functional properties in a road traffic situation with several hundred vehicles. In such cases, it is conventionally possible to fall back on simulations, e.g. through computer-based codes, which may partially lead to unreliable results, however. Exemplary embodiments may make possible a use of conventional WLAN devices or also WLAN devices modified in accordance with some exemplary embodiments, which produce at specific times a channel load by the transmission of data packets so that, as in a real case, channel loads, data packet collisions or hidden node station problems, which may be expected, can occur.

In an exemplary embodiment of the present invention, conventional WLAN devices may be used in combination with additional components, for example, if a predetermined WLAN driver is not available. This may be the case e.g. in WLAN users such as original equipment manufacturers (OEM). Associated drivers may belong to e.g. chip manufacturers, and may not be publicly accessible or be publicly accessible only in a limited way. In another example embodiment of the present invention, e.g. if a driver is available, exemplary embodiments may offer a possibility for adapting a software, e.g. driver software.

In order to achieve this, a bypass is sought of a carrier detection characteristic of a communication protocol, e.g. IEEE802.11, which is responsible for avoiding data collisions for a control of the channel usage by communication participants. The channel detection of IEEE802.11 monitors the channel for a specific time span, which is defined in a baseline. If no signal is measured above a defined limit (e.g. −85 dBm), then a separate data packet is transmitted. Otherwise a countdown mechanism is used, such as is defined e.g. in the IEEE802.11 baseline, and the data packet is transmitted as soon as the countdown reaches a value of zero. The countdown is stopped, however, if a usage of the channel is determined while the countdown is running.

For example, if four WLAN devices are used in a scenario with high channel load, a conventional WLAN device, which attempts to emulate the previously described channel load, data collisions or hidden node behavior, would not be able to bring about the targeted channel load or collisions since the channel detection is still running. Expressed differently, the WLAN device is able to detect if one of the four devices is currently transmitting and is able to avoid a data collision in that it itself does not transmit. In this manner, four WLAN devices would be able to use the channel in such a way as if a total of five devices were present in the environment. Exemplary embodiments of the present invention are able to avoid such a behavior, and are able to bring about channel load, data collisions or hidden node behavior.

FIG. 1 shows a simulation system 100 for a communication system, comprising a first transmitter-receiver 110 and a second transmitter-receiver 120. A transmitter-receiver may be e.g. a WLAN device. From the perspective of first transmitter-receiver 110, there exist an uplink direction 101 and a downlink direction 102 for a data transmission, or, in other words, a communication with second transmitter-receiver 120 or another transmitter-receiver of the communication system. According to an exemplary embodiment of the present invention, it is possible to bypass for example a determination of a transmitting activity in the context of a communication protocol by damping downlink direction 102. The damping may occur above a predefined threshold. Consequently, the channel detection cannot measure a signal above this threshold, and first transmitter-receiver 110 is able to send a separate data packet. According to another exemplary embodiment of the present invention, it is possible also to bypass the communication protocol itself by a suitable development of hardware or software of first transmitter-receiver 110. The development has the effect of modifying a return signal within the scope of the communication protocol, which includes information about a channel occupancy, in such a way that the return signal comprises information about a channel release. The development has the additional effect that a countdown having a time value greater than zero until a channel is released assumes a value equal to zero.

Figure 2:
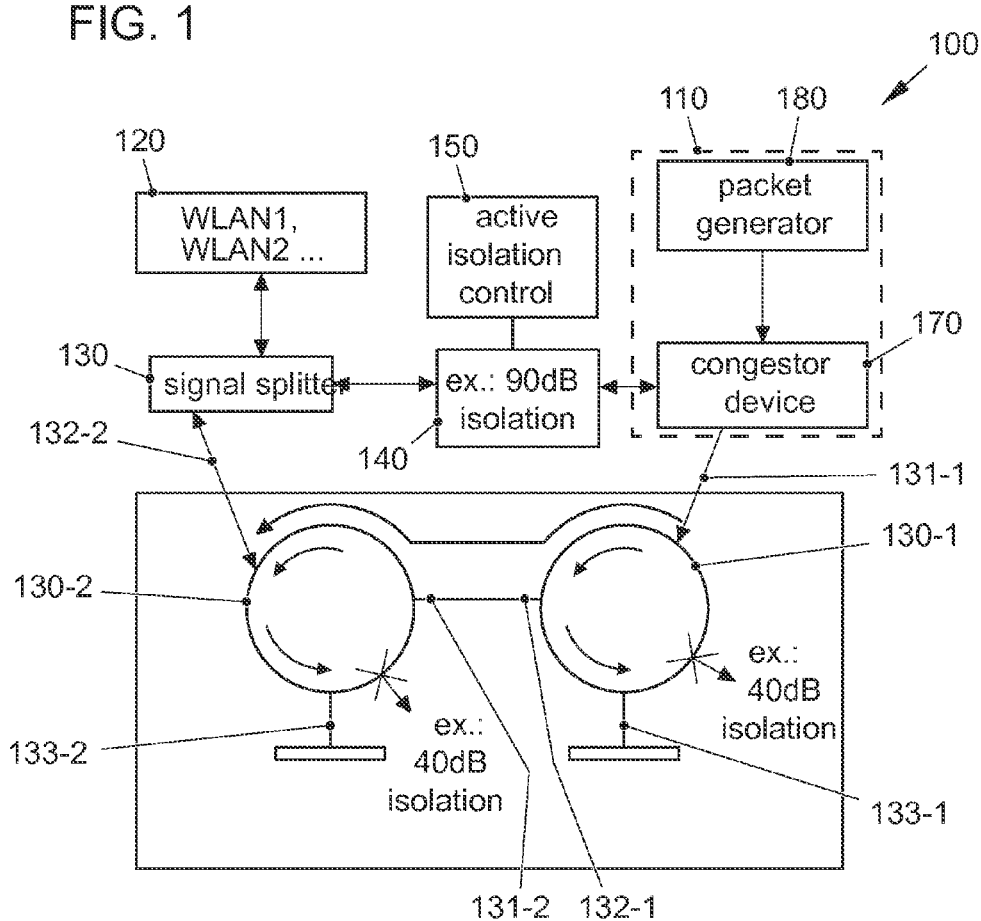
FIG. 2 shows a detailed representation of a simulation system for a communication system according to one exemplary embodiment of the present invention.

FIG. 2 shows a detailed representation of simulation system 100 for a communication system having a communication protocol. The communication protocol regulates a communication between at least two transmitter-receivers of the communication system via a common communication channel in such a way that a first transmitter-receiver 110, in order to avoid a data collision, transmits a data packet only when no usage of the communication channel by a second transmitter-receiver 120 is indicated to the first transmitter-receiver 110. The simulation system is in this instance developed in such a way that at least the first transmitter-receiver 110 sends a data packet via the common communication channel even when at least the second transmitter-receiver 120 is using the communication channel. The first and the second transmitter-receiver 110; 120 may be for example carrier sense multiple access (CSMA) devices having a collision avoid (CA) function, which is developed for communication across a wireless local area network (WLAN). Accordingly, the communication protocol may be e.g. a WLAN protocol according to an IEEE802.11 standard. First transmitter-receiver 110 comprises a packet generator 180 for generating a data packet. The data packet is sent via a congestor device 170, which is likewise comprised by first transmitter-receiver 110.

Simulation system 100 may generally correspond to e.g. a third generation partnership project (3GPP)-standardized mobile communication network. Simulation system 100 generally may be e.g. a long-term evolution (LTE) system, an LTE-advanced (LTE-A) system, a high speed packet access (HSPA) system, a universal mobile telecommunication system (UMTS) or a UMTS terrestrial radio access network (UTRAN), an evolved UTRAN (e-UTRAN), a global system for mobile communication (GSM) or enhanced data rates for GSM evolution (EDGE) network, a GSM/EDGE radio access network (GERAN), or may correspond to a mobile communication network having a different standard, e.g., a worldwide interoperability for microwave access (WIMAX) network IEEE 802.16 or wireless local area network (WLAN) IEEE 802.11, generally an orthogonal frequency division multiple access (OFDMA) network, a time division multiple access (TDMA) network, a code division multiple access (CDMA) network, a wideband CDMA (WCDMA) network, a frequency division multiple access (FDMA) network, a spatial division multiple access (SDMA) network, etc.

In an exemplary embodiment of the present invention, shown in FIG. 2, a circulator is connected between the first transmitter-receiver and the second transmitter-receiver so that a first terminal of the circulator is connected to the first transmitter-receiver and a second terminal of the circulator is connected to the second transmitter-receiver. FIG. 2 shows a series connection of two circulators 130-1; 130-2, each of which has three terminals. For this purpose, respectively, first terminal 131-1 is situated in the direction of first transmitter-receiver 110, and second terminal 132-1; 132-2 is situated in the direction of second transmitter-receiver 120. In this manner, it is possible to provide the data packet originating from first transmitter-receiver 110 on the second terminal 132-1; 132-2 of each of the two circulators 130-1; 130-2, and to provide a damped representation of an input signal originating from second transmitter-receiver 120 on the first terminal 131-1; 131-2 of each of the two circulators 130-1; 130-2. Furthermore, circulators 130-1; 130-2 respectively have a third terminal 133-1; 133-2 having a terminal impedance of 50 ohm. The arrangement made up of multiple circulators is able to amplify a damping of a signal from second transmitter-receiver 120 to first transmitter-receiver 110, e.g. by 40 dB per circulator, in order to achieve a desired degree of damping.

First transmitter-receiver 110 is connected to second transmitter-receiver 120 additionally via an isolator segment 140. Isolator segment 140 effects a damping of an input signal originating from second transmitter-receiver 120, for example by or to 90 dB. For this purpose, isolator segment 140 is connected to a control element 150. Control element 150 provides a control signal to isolator segment 140, which effects a modification of a damping of the additional input signal in such a way that a usage of the communication channel by a second transmitter-receiver 120 is temporarily indicated to first transmitter-receiver 110.

It is thus possible to bypass a protocol-conforming ascertainment of a channel currently used for sending (channel sensing) by way of the splitting into an uplink direction and a downlink direction performed here. The uplink direction (via circulators 130-1; 130-2) is damped in the process to 110 dB for example, which may correspond to a limit value, so that the congestor device 170 no longer detects signals of other transmitter-receivers. In other words, channel sensing is thus indirectly switched off. Congestor device 170 is thus able to send data packets at any time. However, this would occupy the channel directly and would prevent other transmitter-receivers from sending their own data packets. On the other hand, it is possible in this case purposely to bring about otherwise undesired data collisions during the sending of a first data packet from congestor device 170 if another transmitter-receiver has already begun sending a data packet. If such situations are not desired, the simulation system optionally has a signal splitter 160, which splits a signal originating from second transmitter-receiver 120 and transmits a first representation of the signal via isolator segment 140 and a second representation of the signal via circulators 130-1; 130-2. The isolation of the isolator segment may be e.g. 90 dB. This isolation is switched off by control element 150 before congestor device 170 generates a data load. A hardware or software (e.g. driver) of congestor device 170 is thus able to detect signals of other transmitter-receivers, which cancels the damping effect of circulators 130-1; 130-2 for a predetermined time span. As soon as a free state of the channel is ascertained, the isolation (or the damping) may be reactivated. This may prevent the occurrence of initial data collisions and possibly allow for a more comprehensive control over a prevailing data load in the channel. By using packet generator 180 with congestor device 170, which generates data packets and transmits these via congestor device 170, it is possible to produce a desired test environment having a predetermined data load, data collisions and hidden node behavior.

Figure 3:
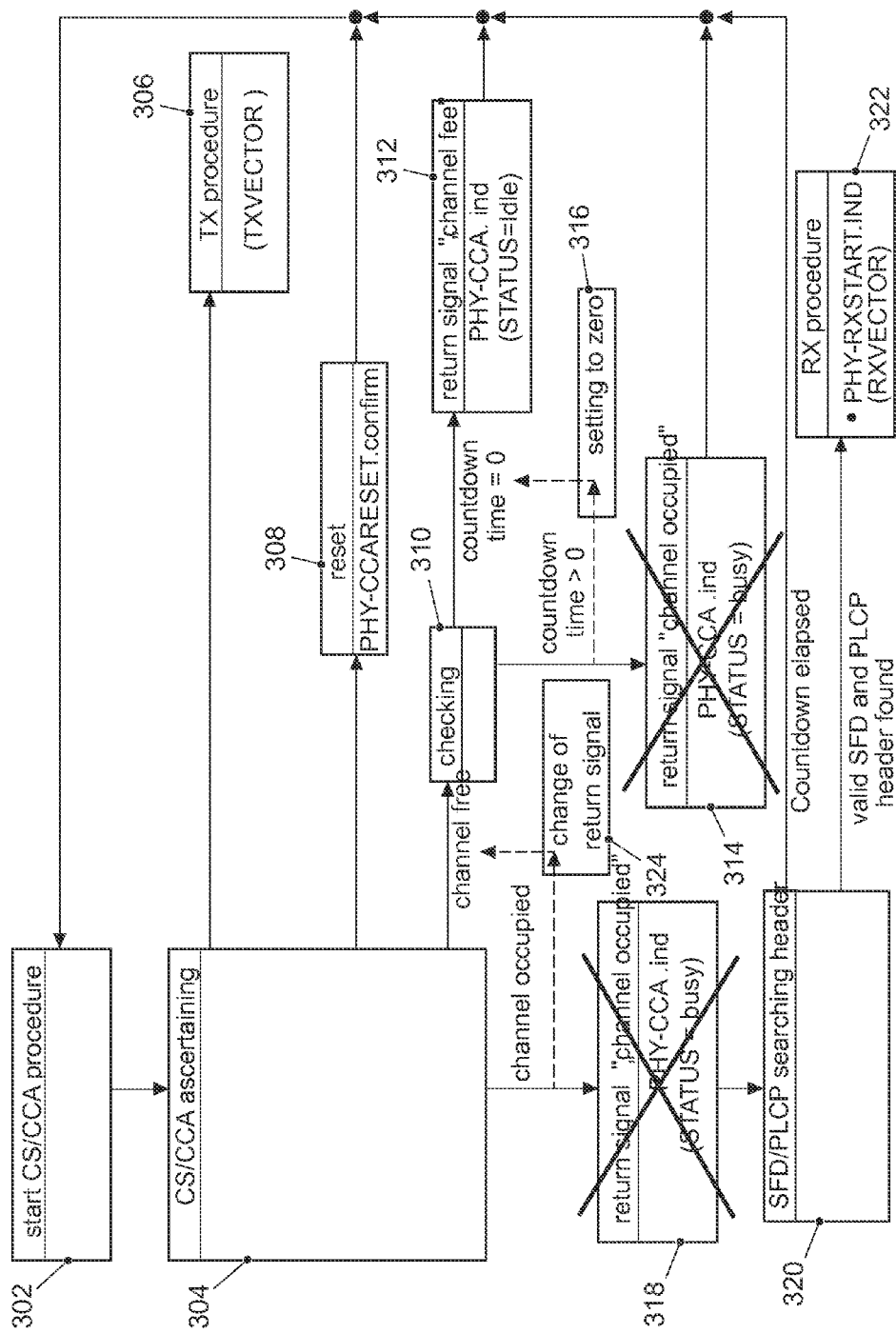
FIG. 3 shows a block diagram of a driver implementation according to one exemplary embodiment of the present invention.

According to an exemplary embodiment of the present invention, a driver may be provided whose functionality is shown as a flow chart in FIG. 3. The driver may be implemented in hardware or software. Expressed differently, the first transmitter-receiver or the congestor may comprise a processor, which is designed to execute a program corresponding to the driver software, or the functionality of the driver may be achieved by a hardware implementation in the form of electrical or electronic components. A driver may be accessible to a chip manufacturer for example. The first transmitter-receiver may comprise for example a physical layer convergence protocol (PLCP) machine, which is developed to ascertain a load of the channel and to output a return signal (PHY-CCA.indicate), whereby a sending of a data packet by the first transmitter-receiver may be prevented. In this case, neither a sending nor a backoff may be possible.

A detailed implementation is shown in FIG. 3. First there is a start 302 of a procedure of a driver software or an activation of a corresponding hardware implementation. This is followed by an ascertainment 304 of operating states such as for example a counter reading of a countdown and data transmissions currently using the channel. If no data transmission is currently active in the channel, a transmit procedure (TX) 306 is called. If a query for resetting the countdown is ascertained, the reset 308 of the countdown may occur, and the procedure may start anew.

In the event of a free channel, a check 310 of the countdown reading is performed. If the countdown is at zero, a return signal is sent 312 with information about a release of the channel, and subsequently the procedure is restarted if indicated. According to a conventional implementation, if the countdown is at a value above zero, a return signal 314 is output, which contains information about a current usage of the channel, and thereafter the procedure is restarted, if indicated. According to some exemplary embodiments, in this case a setting 316 of the countdown is triggered from its current value that is different than zero to zero, and return signal 312 is output with information about a release of the channel.

If a usage of the channel is determined as a result of the ascertainment 304, then, according to a conventional implementation, a return signal 318 is output about a current usage of the channel. This is followed by a search 320 for a start frame delimiter (SFD)/PLOP header. If the countdown reaches zero during the search 320, the procedure is restarted. If a valid SFD and/or PLCP header is found, a receiving procedure (RX) 322 may be started. According to some exemplary embodiments, in this case a change 324 of the return signal with information about a current usage of the channel is performed to produce a return signal with information about a release of the channel. In other words, by way of the change 324 and the setting 316, it is possible to bypass or overwrite a return signal corresponding to the communication protocol about an actually prevailing usage of the channel.

Figure 4:
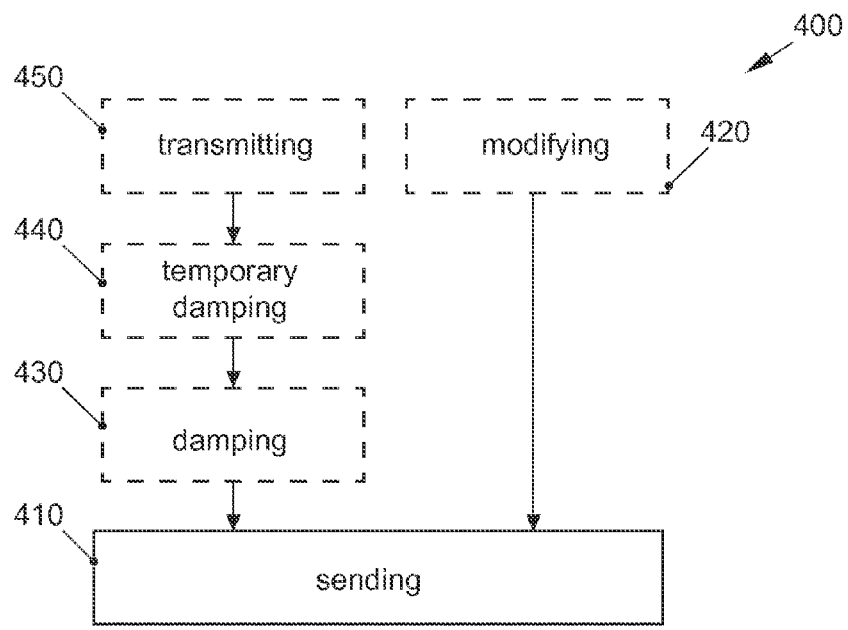
FIG. 4 shows a flow chart of a method according to one exemplary embodiment of the present invention.

FIG. 4 shows a flow chart for a method 400 for simulating a communication system having a communication protocol. The communication protocol regulates a communication between at least two transmitter-receivers of the communication system via a common communication channel in such a way that a first transmitter-receiver, in order to avoid a data collision, transmits a data packet only when no use of the communication channel by a second transmitter-receiver is indicated to the first transmitter-receiver. Method 400 comprises a sending 410 of a data packet by at least the first transmitter-receiver via the common communication channel even when at least the second transmitter-receiver is using the communication channel.

In an exemplary embodiment of the present invention, with reference to FIG. 3, method 400 optionally comprises a modification 420 of a return signal, which comprises information about a current usage or release of the channel. The modification 420 occurs in such a way that the return signal comprises information about a release of the channel irrespective of an actual usage of the channel. The return signal optionally comprises a remaining time value until the channel is released. For this purpose, the modification 420 of the return signal occurs in such a way that the return signal comprises a time value of zero irrespective of an actually remaining time value, as in an exemplary embodiment of a simulation or replication of a communication system. The return signal may be generated or modified e.g. by a driver software or a corresponding hardware implementation. The hardware implementation may be comprised by the first transmitter-receiver. The first transmitter-receiver may alternatively comprise a programmable hardware component (microcontroller, processor, etc.), which is designed to execute the driver software (e.g. a computer program).

In an exemplary embodiment of the present invention, with reference to FIG. 2, the communication channel has an uplink direction and a downlink direction. The method furthermore comprises a damping of a direction from the group of the uplink direction and the downlink direction in such a way that no usage of the communication channel by the second transmitter-receiver is indicated to the first transmitter-receiver. In other words, the damping has the effect that a signal using the channel does not exceed a specified value, e.g. 110 dB, and that therefore a driver software associated with the first transmitter-receiver cannot determine a usage of the channel and generates a return signal including information about a release of the channel. This makes it possible to bypass the communication protocol. In some exemplary embodiments, method 400 optionally comprises a temporary damping 440 of an additional direction from the group of the uplink direction and the downlink direction in such a way that no usage of the communication channel by the first transmitter-receiver is indicated to the second transmitter-receiver. Expressed differently, signals may reach the first transmitter-receiver both via the uplink direction as well as via the downlink direction. One of the two directions may be permanently damped, and the other may be temporarily damped, so that via the latter direction the signal is able to reach the first transmitter-receiver at full strength when there is no damping. This is able to cancel the damping in the other direction if for a certain time interval no data collision is desired. In some exemplary embodiments, method 400 furthermore comprises a transmission 450 of a representation of an input signal originating from the second transmitter-receiver via the uplink direction, and another representation of the input signal originating from the second transmitter-receiver via the downlink direction by way of a signal splitter. This allows for a transmission of the input signal to the first transmitter-receiver via multiple directions, as in an exemplary embodiment of a simulation or replication of a communication system.

Optionally, the damping 430 of the direction or of the additional direction occurs with the aid of a circulator in such a way that a damped representation of an input signal coming in on a first terminal of the circulator through the second transmitter-receiver is provided on a second terminal of the circulator. A circulator may effect a damping by a specific amount. As already shown in FIG. 2, multiple circulators, e.g. in series connection, may also be used. This may further amplify a damping effect on the input signal until a desired threshold value is no longer exceeded. Optionally, the temporary damping 440 of the direction or of the additional direction occurs by way of an insulator segment between the first transmitter-receiver and the second transmitter-receiver. For this purpose, a control element provides a control signal to the insulator segment, which effects a modification of the temporary damping 440 in such a way that a usage of the communication channel by a second transmitter-receiver is indicated to the first transmitter-receiver. Expressed differently, it is thus possible actively to control when a simultaneous sending of the first and the second transmitter-receiver on the common channel can occur and when it cannot occur. By way of the control device, the temporary damping 440 may bring about during a time interval a signal strength below a threshold value for detecting a channel usage, and during an additional time interval may bring about a signal strength above the threshold value or even suppress it altogether.

Exemplary embodiments of the present invention make it possible to include conventional devices for test purposes in the simulation system. Exemplary embodiments furthermore make it possible to check and test V2V/V2X scenarios, which would otherwise be very costly or would not be possible at all or only with great difficulty. Exemplary embodiments also make it possible so simulate situations using a reduced number of vehicles, for which otherwise a comparatively greater number of vehicles would be required. Exemplary embodiments make it possible e.g. to test a reliability of a communication network, for example, whether, in spite of data collisions, a reception of data packets is possible in a desired measure, or what effects a data loss through collisions has.

Figure 5:
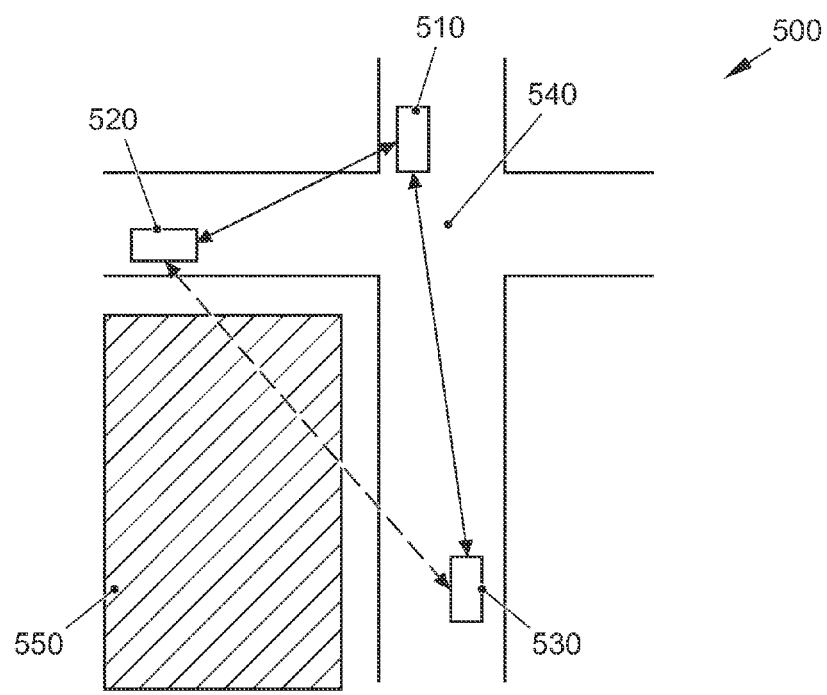
FIG. 5 shows an exemplary constellation of transmitter-receivers that may be simulated according to an exemplary embodiment of the present invention.

The method and simulation system described in the preceding exemplary embodiments may be used respectively in different scenarios or may be used for testing a V2V/V2X communication in different scenarios. Such a possible scenario is represented in FIG. 5. There is a traffic situation 500, in which a first vehicle 510 reaches an intersection 540. A second vehicle 520 is on a cross street, which crosses the street on which first vehicle 510 is located. A third vehicle is located at a distance from intersection 540 on the same street as first vehicle 510. The vehicles are respectively equipped with a transmitter-receiver. A radio link exists between first vehicle 510 and second vehicle 520 as well as between first vehicle 510 and third vehicle 530. An obstacle 550, for example a building, is located between third vehicle 530 and second vehicle 520 so that a possible radio link is interrupted in this direction. Since second vehicle 520 has no knowledge of whether third vehicle 530 is currently transmitting a data packet on a specific channel, it is possible that second vehicle 520 is transmitting its own data packet simultaneously. This may cause a data collision in first vehicle 510. Exemplary embodiments may make it possible to emulate or test the behavior of a communication system or even of an individual transmitter-receiver in first vehicle 510. For this purpose, the re-enactment of the situation using real vehicles may possibly be avoided, which allows for savings in terms or effort and cost.

The features disclosed in the preceding description, the following claims and the appended figures may be significant and may be implemented both individually as well as in any combination for realizing an exemplary embodiment in different developments.

Although some aspects were described in connection with a device, it is understood that these aspects also represent a description of the corresponding method so that a block or a component of a device is also to be understood as a corresponding method step or as a feature of a method step. Analogously, aspects that were described in connection with or as a method step also represent a description of a corresponding block or detail or feature of a corresponding device.

Depending on the specific implementation requirements, exemplary embodiments of the present invention may be implemented in hardware or in software. The implementation may be performed by using a digital memory medium, for example a floppy disk, a DVD, a Blu-ray disk, a CD, a ROM, a PROM, an EPROM, an EEPROM or a FLASH memory, a hard disk or another magnetic or optical memory, on which electronically readable control signals are stored, which are able to interact or interact with a programmable hardware component in such a way that the respective method is carried out.

A programmable hardware component may be formed by a processor, a computer processor (CPU=central processing unit), a graphics processor (GPU=graphics processing unit), a computer, a computer system, an application-specific integrated circuit (ASIC), an integrated circuit (IC), a one-chip system (SOC=system on chip), a programmable logic element or a field-programmable gate array (FPGA) having a microprocessor.

The digital storage medium may therefore be machine-readable or computer-readable. Some exemplary embodiments thus comprise a data carrier, which has electronically readable control signals, which are able to interact with a programmable computer system or a programmable hardware component in such a way that one of the methods described herein is carried out. One exemplary embodiment is thus a data carrier (or a digital storage medium or a computer-readable medium), on which the program for carrying out the method described herein is stored.

Generally, exemplary embodiments may be implemented as a program, as firmware, as a computer program or computer program product having program code or as data, the program code or the data acting so as to carry out one of the methods when the program is run on a processor or a programmable hardware component. The program code or the data may also be stored for example on a machine-readable carrier or data carrier. The program code or the data may exist, inter alia, as source code, machine code or byte code or another intermediary code.

Another exemplary embodiment is furthermore a data flow, a signal string or a sequence of signals, which represent(s) the program for carrying out one of the methods described herein. The data flow, the signal string or the sequence of signals may be configured for example so as to be transferred via a data communication link, for example via the Internet or another network. Exemplary embodiments are thus also signal strings representing data, which are suitable for transmission via a network or a data communication link, where the data represent a program.

According to one exemplary embodiment, a program may implement one of the methods when it is being executed for example in that it reads out storage locations or writes a datum or multiple data into these storage locations, whereby switching processes or other processes in transistor structures, in amplifier structures or in other electrical, optical, magnetic components or components operating according to another functional principle are prompted. Accordingly, a program is able to detect, determine or measure data, values, sensor values or other information by reading out a storage location. By reading out one or multiple storage locations, a program is able to detect, determine or measure variables, values, measured variables and other information and effect, prompt or carry out an action by writing into one or multiple storage locations as well as control other devices, machines and components.

The above-described exemplary embodiments represent only an illustration of the principles of the present invention. It is understood that modifications and variations of the arrangements and details described herein will be clear to other persons skilled in the art. For this reason, the present invention is intended to be limited merely by the protective scope of the subsequent patent claims and not by the specific details that were presented herein on the basis of the description and the explanation of the exemplary embodiments.

LIST OF REFERENCE NUMERALS 100 simulation system
101 uplink direction
102 downlink direction
110 first transmitter-receiver
120 second transmitter-receiver
130-1; 130-2 circulator
131-1; 131-2 first terminal
132-1; 132-2 second terminal
133-1; 133-2 third terminal
140 isolator segment
150 control element
160 signal splitter
170 congestor device
180 packet generator
302 start
304 ascertaining
306 transmit procedure
308 reset
310 check
312 return signal
314 return signal
316 setting
318 return signal
320 search
322 reception procedure
324 change
400 method
410 sending
420 modifying
430 damping
440 temporary damping
450 transmitting
500 traffic situation
510 first vehicle
520 second vehicle
530 third vehicle
540 intersection
550 obstacle

What is claimed is:

1. A method for simulating a communication system having a communication protocol which regulates a communication between at least two transmitter-receivers of the communication system via a common communication channel to only permit a first transmitter-receiver to transmit a data packet when no use of the common communication channel by a second transmitter-receiver is indicated to the first transmitter-receiver, the method comprising:
   sending a data packet by at least the first transmitter-receiver via the common communication channel even when at least the second transmitter-receiver is using the common communication channel; and
   damping the common communication channel above a predefined threshold along a downlink direction with respect to the first transmitter receiver;
   wherein a channel detection of the first transmitter receiver cannot detect a data packet transmitted below the predefined threshold.

2. The method according to claim 1, further comprising:
modifying a return signal to include information about a release of the common communication channel irrespective of an actual usage of the common communication channel.

3. The method according to claim 2, the modifying step further comprising:
modifying the return signal to include a remaining time value until a release of the common communication channel of zero irrespective of an actually remaining time value.

4. The method according to claim 1, wherein a damped representation of an input signal on a first terminal of a circulator through the second transmitter-receiver is provided on a second terminal of the circulator.

5. The method according to claim 1, further comprising:
temporarily damping an additional direction from the group of the uplink direction and the downlink direction above the predefined threshold.

6. The method according to claim 5, further comprising:
transmitting a first representation of an input signal originating from the second transmitter-receiver via the uplink direction; and
transmitting a second representation of the input signal originating from the second transmitter-receiver via the downlink direction by way of a signal splitter.

7. The method according to claim 5,
wherein the temporary damping occurs by way of an isolator segment between the first transmitter-receiver and the second transmitter-receiver; and
wherein a control element provides a control signal to the isolator segment, which effects a modification of the temporary damping such that a usage of the common communication channel by a second transmitter-receiver is indicated to the first transmitter-receiver.

8. A system for simulating a communication system having at least a first and a second transmitter-receiver and a communication protocol which regulates a communication between the at least two transmitter-receivers of the communication system via a common communication channel to only permit a first transmitter-receiver to transmit a data packet when no use of the common communication channel by a second transmitter-receiver is indicated to the first transmitter-receiver, the system comprising:
one of a computer, a processor, or a programmable hardware component configured to:
send a data packet by at least the first transmitter-receiver via the common communication channel even when at least the second transmitter-receiver is using the common communication channel; and
damp the common communication channel above a predefined threshold along a downlink direction with respect to the first transmitter receiver;
wherein a channel detection of the first transmitter receiver cannot detect a data packet transmitted below the predefined threshold.

9. The system according to claim 8, the one of a computer, a processor, or a programmable hardware component further configured to:
modify a return signal to include information about a release of the common communication channel irrespective of an actual usage of the common communication channel.

10. The system according to claim 9, the one of a computer, a processor, or a programmable hardware component further configured to:
modify the return signal to include a remaining time value until a release of the common communication channel of zero irrespective of an actually remaining time value.

11. The system according to claim 8, the one of a computer, a processor, or a programmable hardware component further configured to:
temporarily damp an additional direction from the group of the uplink direction and the downlink direction above the predefined threshold.

12. The system according to claim 11, the one of a computer, a processor, or a programmable hardware component further configured to:
transmit a first representation of an input signal originating from the second transmitter-receiver via the uplink direction; and
transmit a second representation of the input signal originating from the second transmitter-receiver via the downlink direction by way of a signal splitter.

13. A simulation system for a communication system having a communication protocol which regulates a communication between at least two hardware transmitter-receivers of the communication system via a common communication channel to only permit a hardware first transmitter-receiver to transmit a data packet when no use of the common communication channel by a hardware second transmitter-receiver is indicated to the first transmitter-receiver, comprising:
the at least two transmitter-receivers, including the first and second transmitter-receivers;
a circulator connected between the first transmitter receiver and the second transmitter receiver;
a first terminal of the circulator connected to the first transmitter-receiver;
a second terminal of the circulator connected to the second transmitter-receiver;
wherein at least the first transmitter-receiver is configured to transmit a data packet via the common communication channel even when at least the second transmitter-receiver is using the common communication channel;
wherein the circulator is configured to damp the common communication channel above a predefined threshold along a downlink direction with respect to the first transmitter receiver;
wherein a channel detection of the first transmitter receiver cannot detect a data packet transmitted below the predefined threshold; and
wherein the data packet originating from the first transmitter-receiver is provided on the second terminal of the circulator;
wherein a representation of an input signal originating from the second transmitter-receiver is damped above a predefined threshold, and provided on the first terminal of the circulator.

14. The simulation system according to claim 13,
wherein the first transmitter-receiver is connected to the second transmitter receiver via an isolator segment;
wherein the isolator segment effects a damping of an input signal originating from the second transmitter-receiver;
wherein the isolator segment is connected to a control element; and
wherein the control element provides a control signal to the isolator segment, which effects a modification of a damping such that a usage of the common communication channel by a second transmitter-receiver is temporarily indicated to the first transmitter-receiver.

* * * * *